(12) United States Patent
Rolf et al.

(10) Patent No.: US 9,200,728 B2
(45) Date of Patent: Dec. 1, 2015

(54) PIPELAYING

(75) Inventors: Lee Karl Rolf, Inverurie (GB); Henry William Himsworth, Balsham (GB); Lukasz Sobczak, Inverurie (GB)

(73) Assignee: Subsea 7 Limited, Sutton (GB)

( * ) Notice: Subject to any disclaimer, the term of this patent is extended or adjusted under 35 U.S.C. 154(b) by 0 days.

(21) Appl. No.: 14/232,820

(22) PCT Filed: Jul. 12, 2012

(86) PCT No.: PCT/GB2012/051659
§ 371 (c)(1),
(2), (4) Date: Jan. 14, 2014

(87) PCT Pub. No.: WO2013/008022
PCT Pub. Date: Jan. 17, 2013

(65) Prior Publication Data
US 2014/0140772 A1    May 22, 2014

(30) Foreign Application Priority Data
Jul. 14, 2011    (GB) .................................. 1112131.6

(51) Int. Cl.
F16L 1/20    (2006.01)
F16L 1/16    (2006.01)
F16L 3/237    (2006.01)

(52) U.S. Cl.
CPC . *F16L 1/20* (2013.01); *F16L 1/202* (2013.01); *F16L 3/237* (2013.01)

(58) Field of Classification Search
CPC ........... F16L 1/207; F16L 1/235; F16L 3/237; E21B 17/1035
USPC ......... 405/178, 184.5, 158; 414/745.1, 745.4, 414/745.7, 746.7, 746.8; 29/282, 283, 284, 29/281.5
See application file for complete search history.

(56) References Cited

U.S. PATENT DOCUMENTS

| | | | | |
|---|---|---|---|---|
| 1,342,870 | A | * | 6/1920 | Sosthene Robichaux et al. ............................ 166/85.1 |
| 4,441,328 | A | * | 4/1984 | Brister ........................... 62/53.1 |
| 4,535,822 | A | * | 8/1985 | Rogers, Jr. ...................... 138/99 |
| 5,975,802 | A | | 11/1999 | Willis |
| 6,695,539 | B2 | * | 2/2004 | McMillan et al. ............. 405/191 |
| 7,614,593 | B2 | | 11/2009 | McClure et al. |
| 7,861,982 | B1 | | 1/2011 | McClure |
| 2007/0264084 | A1 | * | 11/2007 | Signaroldi et al. ............. 405/158 |
| 2010/0313625 | A1 | * | 12/2010 | Green ......................... 72/409.19 |

FOREIGN PATENT DOCUMENTS

| | | |
|---|---|---|
| DE | 10 2007 041 644 | 4/2008 |
| DE | 20 2009 013 474 | 3/2010 |
| GB | 2081414 A * | 2/1982 |
| GB | 2468918 | 9/2010 |
| WO | WO 01/70564 | 9/2001 |
| WO | WO 0170564 A1 * | 9/2001 |
| WO | WO 2010/012014 | 2/2010 |

* cited by examiner

*Primary Examiner* — Benjamin Fiorello
*Assistant Examiner* — Stacy Warren
(74) *Attorney, Agent, or Firm* — Levi & Grandinetti

(57) ABSTRACT

An apparatus for clamping elongate elements in a parallel piggybacked arrangement during subsea laying of the elements is disclosed. The apparatus has opposed reciprocating jaws for forcing together clamp segments around the elongate elements to assemble a piggybacking clamp that applies clamping forces to the elongate elements.

20 Claims, 14 Drawing Sheets

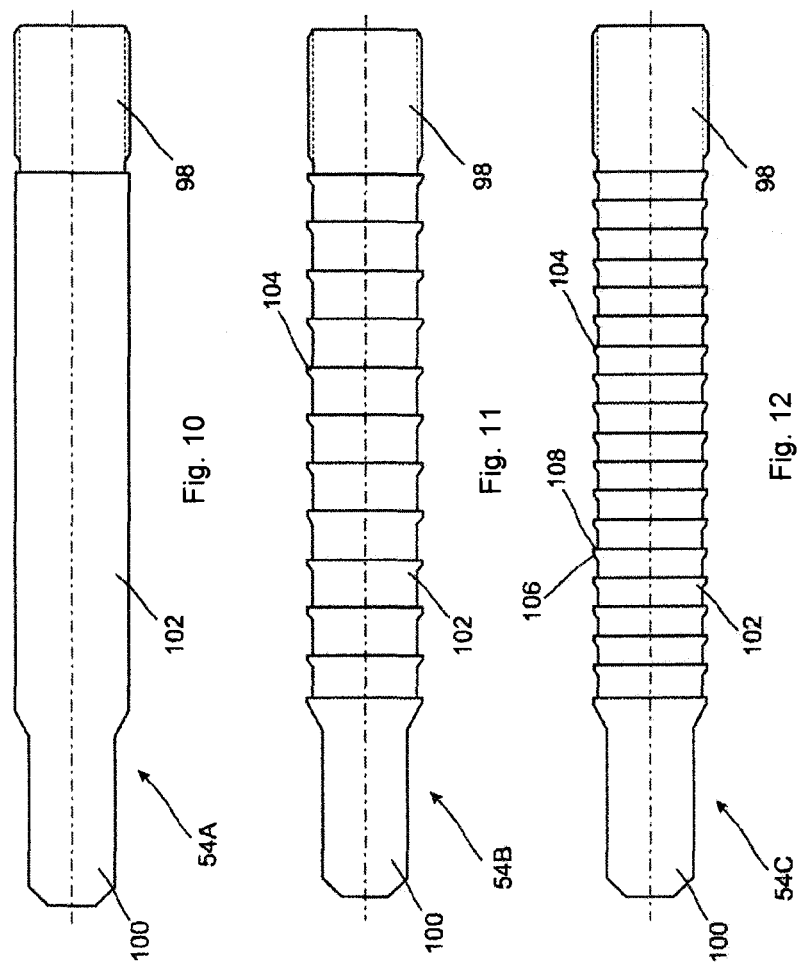

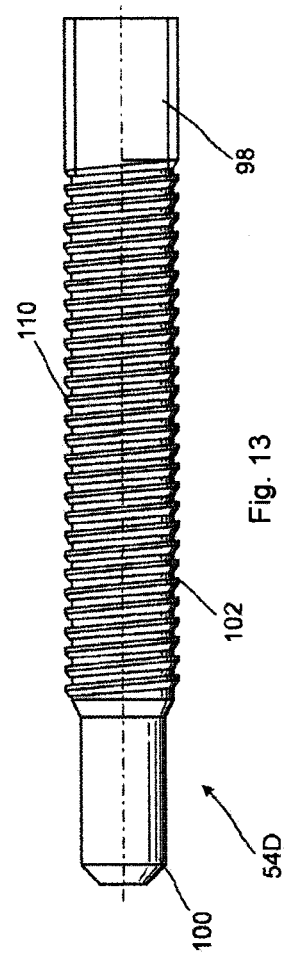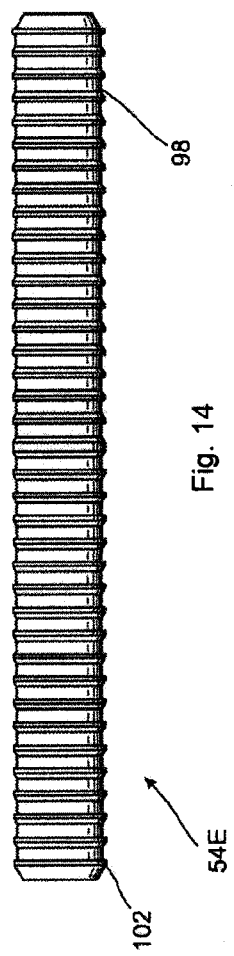

| Barb profile | Puck diameter (mm) | Interference (mm) | Push-in force (kN) | Pull-out force (kN) |
|---|---|---|---|---|
| 3mm ribbed | 60 | 0.7 | 32.0 | 51.1 |
| 3mm ribbed | 60 | 0.8 | 31.5 | 62.6 |
| 3mm ribbed | 60 | 0.8 | 33.9 | 60.6 |
| 3mm ribbed | 60 | 0.8 | 30.4 | 59.2 |
| 3mm ribbed | 60 | 0.7 | 30.9 | 60.7 |
| 5mm ribbed | 60 | 0.7 | 26.7 | 59.7 |
| 5mm ribbed | 60 | 0.9 | 26.8 | 61.0 |
| 5mm ribbed | 60 | 0.8 | 26.6 | 61.9 |
| 5mm ribbed | 60 | 0.7 | 24.2 | 61.2 |
| Plain | 60 | 0.6 | 22.1 | 26.7 |
| M12x1.75 thread | 60 | 0.5 | 26.6 | 43.0 |
| M12x1.75 thread | 60 | 0.5 | 26.9 | 53.4 |
| M12x1.75 thread | 60 | 0.5 | 24.6 | 45.9 |
| M12x1.75 thread | 60 | 0.7 | 25.0 | 48 |
| 3mm ribbed | 30 | 0.8 | 26.4 | 57.6 |
| 3mm ribbed | 30 | 0.8 | 26.5 | 58.5 |
| 3mm ribbed | 30 | 0.8 | 20.8 | 48.6 |
| 3mm ribbed | 30 | 0.8 | 26.2 | 52.4 |
| 3mm ribbed | 30 | 0.8 | 23.4 | 50.4 |
| Buttress 12TPI | 30 | 0.8 | 23.6 | 44.1 |
| Buttress 12TPI | 30 | 0.7 | 21.7 | 29.3 |
| Buttress 16TPI | 30 | 0.8 | 26.1 | 41.5 |
| Buttress 16TPI | 30 | 0.8 | 27.7 | 41.5 |
| Buttress 20TPI | 30 | 0.8 | 33.2 | 48.9 |
| Buttress 20TPI | 30 | 0.8 | 32.0 | 46.9 |
| Knurled | 60 | 2.0 | 59.7 | 48.0 |
| Ring shank | 60 | 0.7 | 18.2 | 27.0 |
| Ø13mm rebar | 60 | 0.6 | 9.6 | 12.4 |
| Ø13mm rebar | 60 | 0.7 | 12.1 | 14.2 |
| Ø13mm rebar | 60 | 0.9 | 13.2 | 16.3 |
| Ø13mm rebar | 60 | 1.7 | 38.9 | 27.3 |

Table 1

Fig. 24

PIPELAYING

CROSS-REFERENCE TO RELATED APPLICATIONS

This Application is the U.S. National Phase of International Application Number PCT/GB2012/051659 filed on Jul. 12, 2012, which claims priority to Great Britain Application No. 1112131.6 filed on Jul. 14, 2011.

BACKGROUND OF THE INVENTION (1) Field of the Invention

This invention relates to systems for joining two or more parallel pipes, cables or other elongate elements during offshore operations, for example in a 'piggyback' arrangement during pipelaying. The invention encompasses joining devices and apparatus and methods for fitting such joining devices to and between pipes, cables or other elongate elements.

(2) Description of Related Art

It is often desirable to install two or more elongate elements along the same subsea route, such as a primary larger-diameter pipe for carrying hydrocarbons and a secondary smaller-diameter pipe for carrying water, gas or chemicals used to produce hydrocarbons.

Whilst pipes will be used as an example in this specification, an element need not be a pipe for carrying fluids but could instead be a cable for carrying power or data. A secondary element will usually be of much smaller diameter (typically <20 cm) than a primary element, but a difference in size between the elements is not essential to the invention in a broad sense.

Where elements such as pipes or cables are to follow the same route, it may be beneficial to install the elements simultaneously. This is commonly achieved by a piggyback technique where one or more secondary elements are attached by a succession of clamps to a primary element on a pipelay vessel, and the elements are then launched together in parallel toward the seabed.

Installation of a piggyback pipeline usually involves unspooling the secondary pipe on a pipelay vessel. The primary pipe may also be unspooled in a reel-lay arrangement although it could be fabricated on the pipelay vessel, for example in an S-lay operation.

A typical reel-lay vessel 10 shown schematically in FIG. 1 is fitted with a storage and deployment reel 12 for deploying a primary pipe 14 and has an adjustable lay ramp 16 that is capable of deploying a range of products at varying lay angles, which may be from circa 20° to 90° to the horizontal. The inclination of the lay ramp 16 is determined by the depth of water in which the pipeline is being laid and by the characteristics of the pipeline, such as its diameter and stiffness.

In downstream succession from the reel 12, the lay ramp 16 carries a guide chute 18 for guiding the primary pipe 14; a pipe straightener 20 for straightening the primary pipe 14; a track-type tensioner 22 for gripping the primary pipe 14 between articulated tracks; and a hold-off clamp 24 for clamping the primary pipe 14 whenever the tensioner 22 releases the primary pipe 14. A travelling clamp could be used instead of a track-type tensioner 22; references in this specification to a tensioner should be taken to include a travelling clamp unless the context demands otherwise.

As FIG. 2 shows, a piggyback reel 26 can be fitted to a vessel 10 for deploying a secondary element such as a secondary pipe 28 with the primary pipe 14 when operating in piggyback mode. In that mode, a piggyback chute 30 guides the secondary pipe 28 and the secondary pipe 28 is brought into alignment with the primary pipe 14, such that the secondary pipe 28 lies parallel to the primary pipe 14 downstream of the tensioner 22. The secondary pipe 28 then lies directly above the longitudinal centreline of the primary pipe 14 or, when the primary pipe 14 is vertical, directly aft of the longitudinal centreline of the primary pipe 14. The secondary pipe 28 is then ready to be clamped to the primary pipe 14 at work platforms in a shelter 32 on the lay ramp 16 between the tensioner 22 and the hold-off clamp 24.

In practice an additional straightener may be used for the secondary pipe 28 downstream of the piggyback chute 30 but this has been omitted from FIG. 2 for clarity. Also, the secondary pipe 28 may go through an additional tensioner but such a tensioner may not be required and has also been omitted for clarity.

In a prior art piggybacking arrangement, it is known for a secondary pipe 28 to be diverted entirely around the tensioner 22 before being aligned with the primary pipe. This makes it difficult to align the secondary pipe 28 without overbending it or requiring additional straightening, unless there is a substantial and disadvantageous gap under the tensioner 22. The heavy tensioner 22 should be mounted as low as possible on the lay ramp 16 to aid the stability of the vessel 10.

U.S. Pat. No. 5,975,802 to Willis (Assignee: Stolt Comex Seaway Ltd.) discloses a known piggyback arrangement in detail, including the relationship between the paths of a primary pipe and a secondary pipe as they pass over their respective chutes and are brought together for clamping. In the example shown in U.S. Pat. No. 5,975,802, the primary pipe is fabricated on board the pipelay vessel and the secondary pipe is unspooled from a reel, although it will be clear to the skilled reader that both pipes could be spooled with the addition of a storage and deployment reel for the primary pipe, as in FIG. 2. The content of U.S. Pat. No. 5,975,802 is incorporated herein by reference, as technical background to the present invention.

A known piggyback clamp 34 shown in FIG. 3 employs a tapered saddle-like block 36 of rubber or polyurethane between a primary pipe 14 and a secondary pipe 28. The block 36 has a concave undersurface shaped to fit the cross-sectional curvature of the primary pipe 14 and a hole for encircling and retaining the secondary pipe 28. The block 36 is in two parts that, when assembled together, define the hole and surround the secondary pipe 28.

In use, the two parts of the block 36 are assembled around the secondary pipe 28 to retain the secondary pipe 28 in the hole. The block 36 retaining the secondary pipe 28 is then attached to the primary pipe 14 by tensioned parallel circumferential straps 38 that encircle the primary pipe 14 and the block 36. The straps 38 keep the two parts of the block 36 together while holding the secondary pipe 28 parallel to and spaced slightly from the primary pipe 14.

The service demands on the clamp 34 are high. The block 36 and the straps 38 must survive the stresses of launching the pipeline from the pipelay vessel 10 to the seabed. The block 36 and the straps 38 may also need to survive the load of pulling the secondary pipe 28 off the piggyback reel 26 if no additional tensioner is used.

Thereafter the block 36 and the straps 38 must continue to retain the secondary pipe 28 on the primary pipe 14 for the life of the pipeline, typically at least twenty years, without significant relative movement between the pipes 14, 28.

During piggyback operations on a pipelay vessel 10 such as that shown schematically in FIG. 2 or as described in detail in U.S. Pat. No. 5,975,802, manual intervention is required close to the pipes 14, 28 on the lay ramp 16 at a location downstream of the tensioner 22, to position, align and manually clamp the pipes 14, 28. In particular, a succession of clamps 34 must be assembled and fitted to the pipes 14, 28 by workers operating in a confined space on the lay ramp 16, which is steeply inclined and will pitch as the pipelay vessel 10 rides the waves. Considerations of safety and accuracy make it necessary to reduce the linear travel speed of the pipes 14, 28 with respect to the vessel 10 while the clamp installation process is carried out, or intermittently to stop the pipelay movement altogether.

Piggyback operations are therefore labour-intensive and inefficient, not just in labour costs but also in vessel time—which is typically worth circa US$300,000 per day. Pipelay rates in piggyback mode may be less than 500 m per hour, and possibly as little as 300-400 m per hour. This is less than half of the typical speed of reel-lay operations without piggybacking, and so approximately doubles vessel time on station and hence greatly increases vessel cost during pipelaying. It will also be apparent that if a pipelay vessel must be on station for say four days instead of two days, it is more likely to encounter weather conditions that will disrupt the pipelaying operation or force its temporary abandonment, again with a potentially great increase in time and cost.

If it would be possible to increase the speed of pipelaying in piggyback mode to approach the typical speed of pipelaying without piggybacking, the cost saving would be very substantial. Of course, it is essential for that saving to be achieved without compromising safety.

It is against this background that the present invention has been devised.

BRIEF SUMMARY OF THE INVENTION

The invention involves securing two half-shell piggypack pads to the primary and secondary elements, clamping the two elements together. The pads are secured by barbs that engage in opposed holes in the mating pads as the pads are brought together.

Thus, the invention resides in apparatus for clamping elongate elements in a parallel piggybacked arrangement during subsea laying of the elements, the apparatus comprising opposed reciprocating jaws for forcing together clamp segments around the elongate elements to assemble a piggybacking clamp that applies clamping forces to the elongate elements.

Each jaw suitably has a cavity for accommodating a respective clamp segment. That cavity may have at least two press surfaces for applying assembly force to separate locations of a clamp segment in the cavity. Such press surfaces suitably extend substantially orthogonally with respect to a reciprocating direction of the jaws. The cavities are preferably shaped between the press surfaces to provide clearance for outward deflection of clamp segments applying clamping forces to the elongate elements.

The cavity advantageously has retention formations engageable with corresponding retention formations of the clamp segments, which retention formations are preferably releasable in a direction generally parallel to the elements.

Where the elongate elements are movable longitudinally with respect to the apparatus during clamping in a launch direction, the cavities are preferably open-sided to allow the assembled clamp to move out of the jaws with the elongate elements in the launch direction. At least one retaining pawl is suitably provided for holding a clamp segment in a cavity until that clamp segment has been assembled into a clamp. The retaining pawl may, for example, be biased into a retaining position to hold the clamp segment in the cavity and may be movable against that bias into a release position to release the clamp segment from the cavity.

Where each clamp segment has two or more generally parallel mutually-spaced recesses shaped to extend partially around respective ones of the elongate elements, the apparatus is advantageously arranged to apply assembly force to one side of a recess and subsequently to another side of that recess.

The apparatus may further comprise a tightening device downstream of the jaws to tighten the engagement of clamp segments initially assembled by the jaws. The tightening device is preferably arranged to apply tightening force between the recesses. Such a tightening device suitably comprises a constriction through which at least part of the clamp passes after leaving the jaws, which constriction may be defined by pinch wheels between which at least part of the clamp is forced after leaving the jaws.

Where the elongate elements are movable longitudinally with respect to the apparatus in a launch direction, the jaws are preferably supported by a carriage that is movable in the launch direction during clamping. The carriage may be movable reciprocally in an engagement stroke in the launch direction during clamping and in a return stroke opposed to the launch direction after clamping. Also, the jaws are advantageously movable in the launch direction with respect to the carriage as the carriage moves in the launch direction during clamping. In that case, the jaws may be movable toward each other on converging paths as they move in the launch direction with respect to the carriage. It is also possible for the jaws to be movable toward each other by a wedge member that is movable longitudinally relative to the carriage, or by actuators acting between the carriage and the jaws.

The invention encompasses a method of clamping elongate elements in a parallel piggybacked arrangement during subsea laying of the elements, the method comprising forcing together a plurality of clamp segments around the elongate elements to assemble a piggybacking clamp that applies clamping forces to the elongate elements.

Assembly force may be applied locally to the clamp segments at different locations of the clamp segments at different times. For example, where each clamp segment has two or more generally parallel mutually-spaced recesses shaped to extend partially around respective ones of the elongate elements, the method suitably comprises applying assembly force to one side of a recess and subsequently to another side of that recess. Assembly force may be applied outboard of the recesses to push together ends of the clamp segments while allowing the clamp segments to bow centrally upon clamping the elongate elements, and subsequently applying force between the recesses to push together central regions of the clamp segments to tighten clamping of the elongate elements.

The clamp segments may be allowed to move with the elongate elements in a launch direction while forcing them together around the elongate elements.

DESCRIPTION OF THE DRAWINGS

To describe the state of the art, reference has already been made to FIGS. 1 to 3 of the accompanying drawings, in which.

Figure 1:
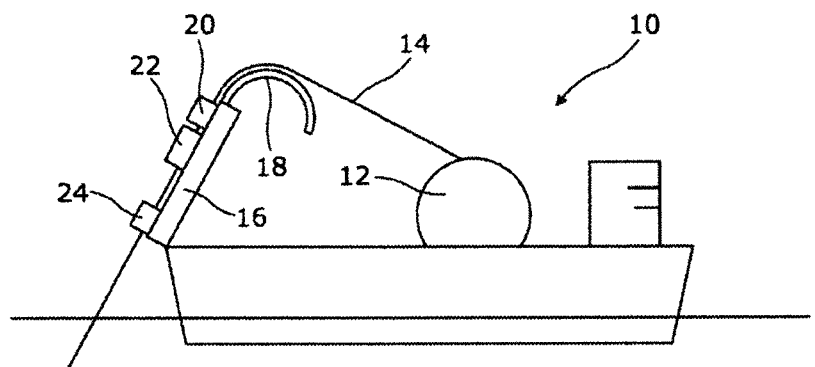
FIG. 1 is a schematic side view of a typical reel-lay vessel.
Figure 2:
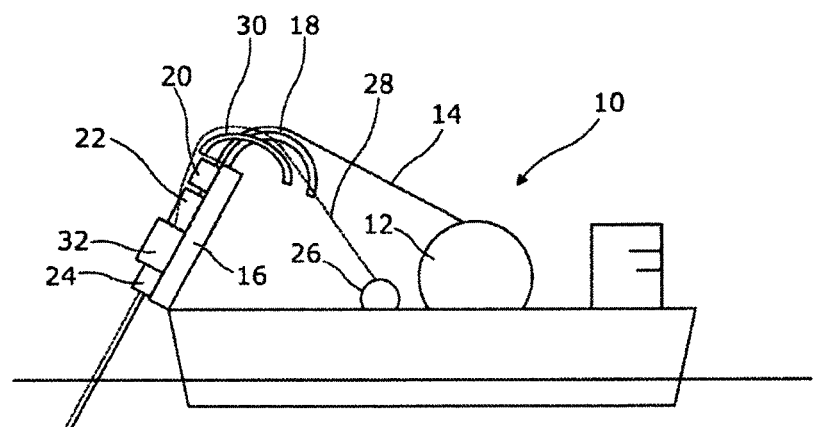
FIG. 2 is a schematic side view of a reel-lay vessel adapted for piggyback pipe laying.
Figure 3:
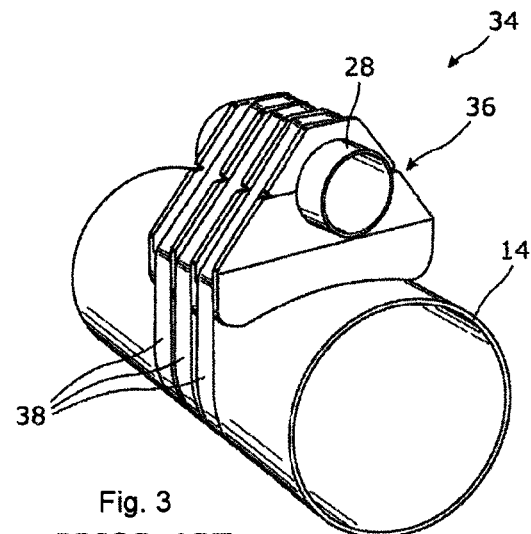
FIG. 3 is a perspective view of primary and secondary pipes joined by a block and straps in accordance with the prior art.
Figure 4:
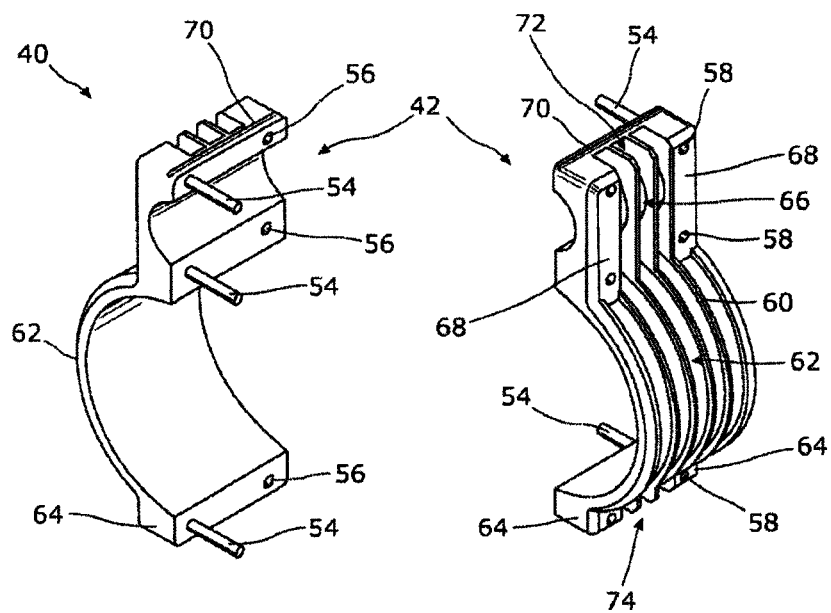
Figures 5, 6:
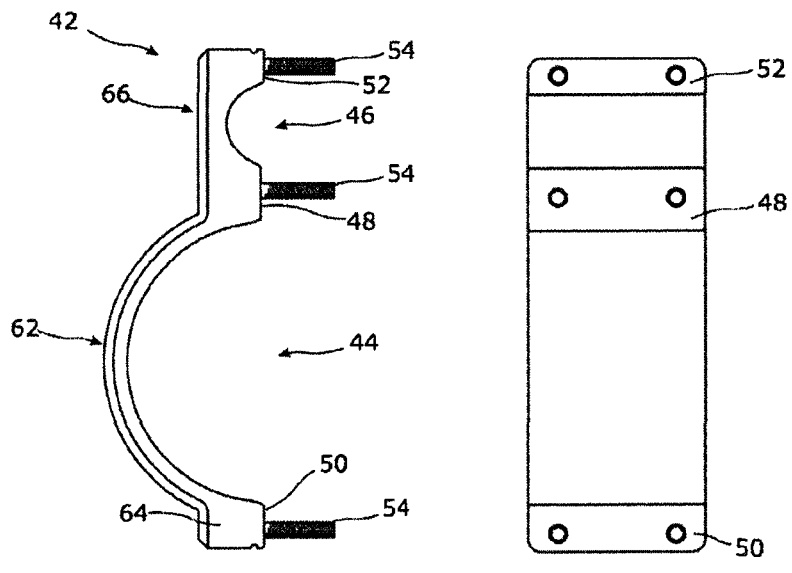
Figure 7:
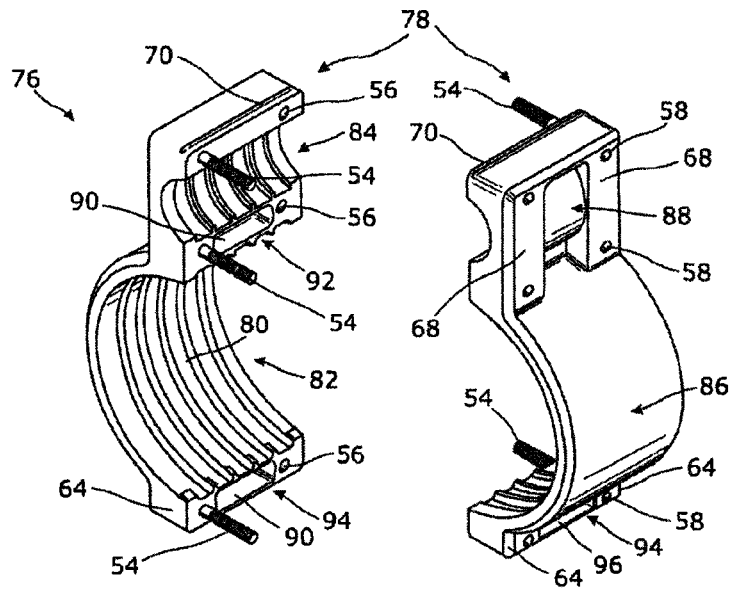
Figure 8:
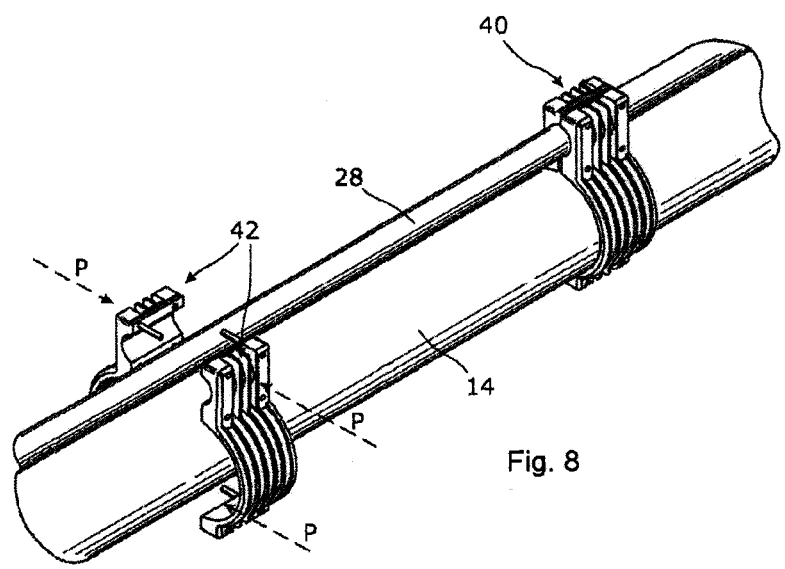
Figure 9:
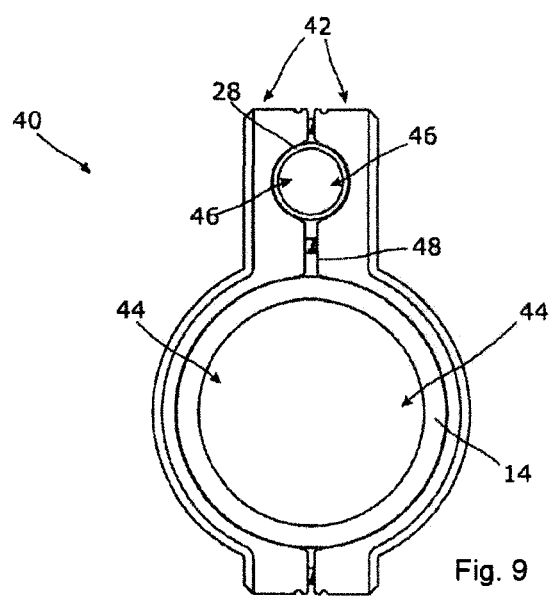
Figure 15:
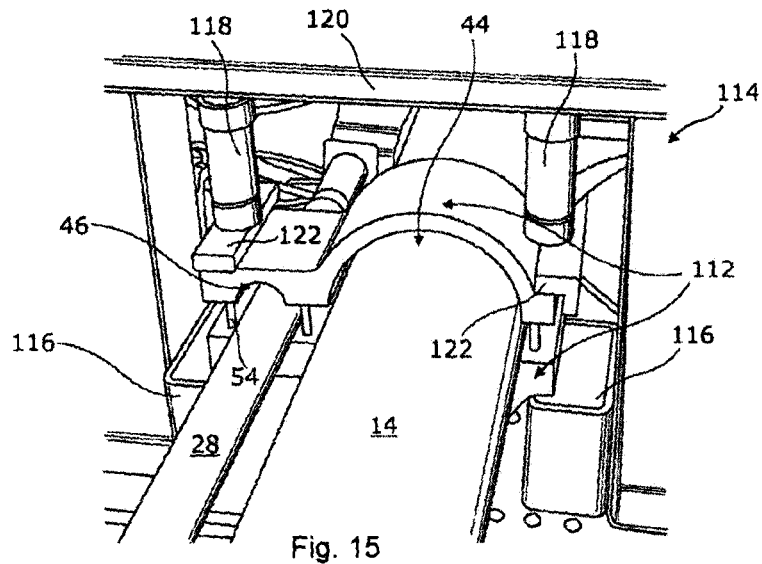
Figure 16:
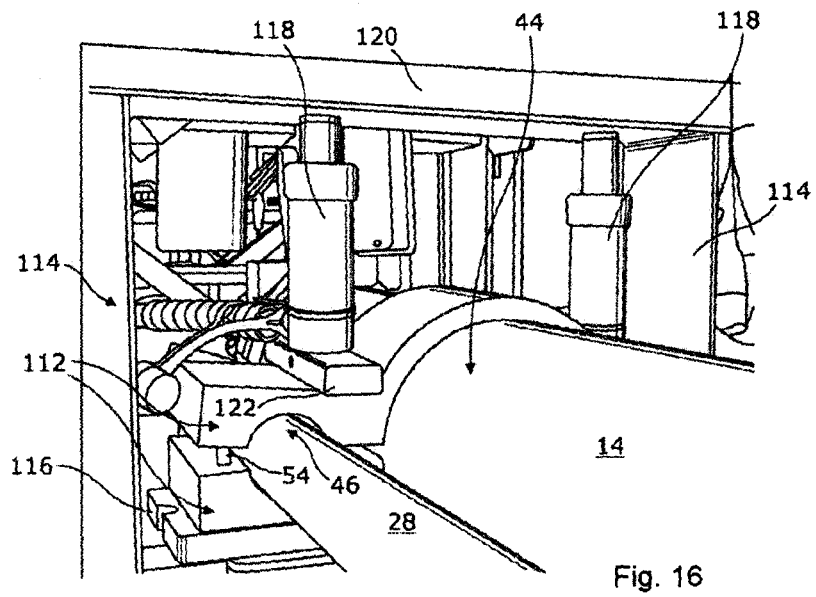
Figure 17:
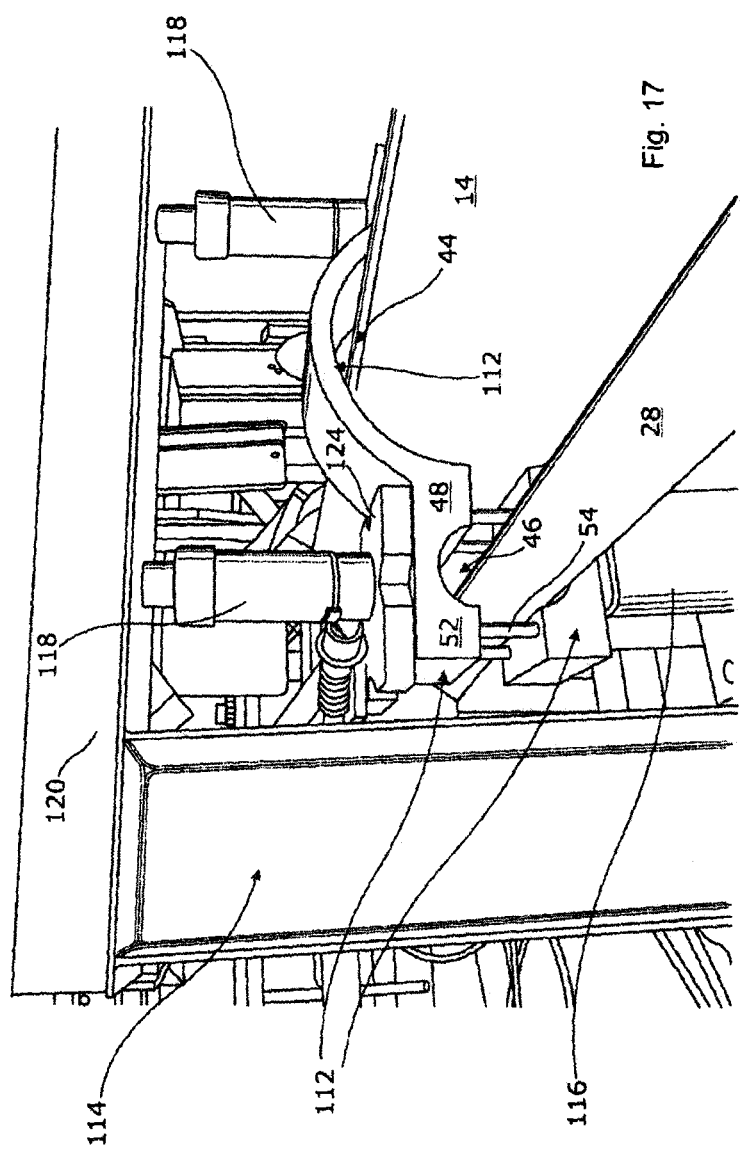
Figure 18:
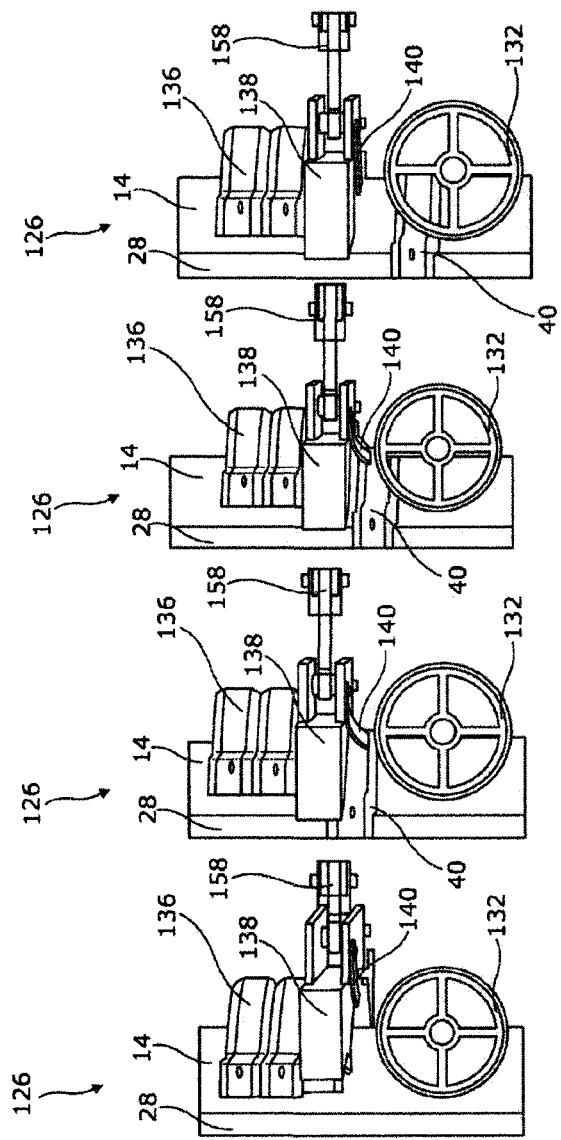
Figure 19:
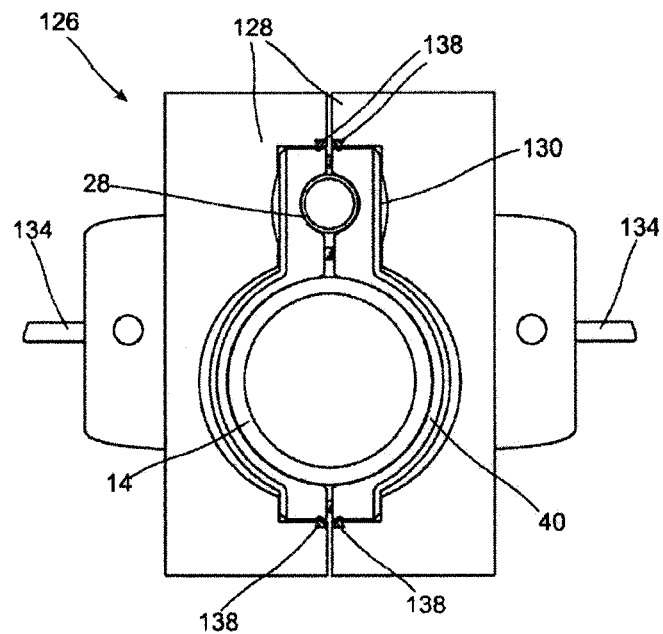
Figure 20:
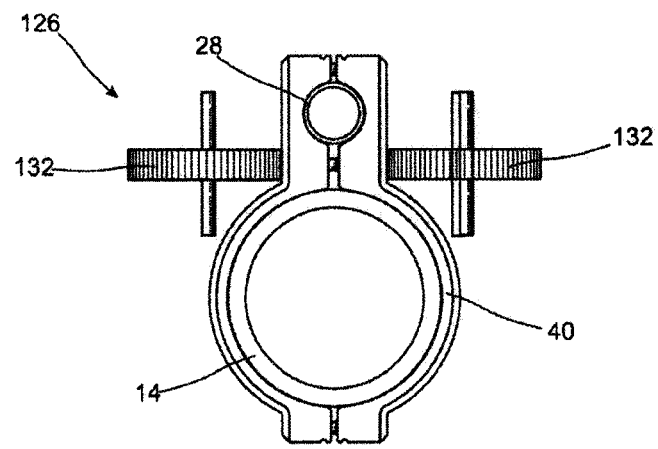
Figure 21:
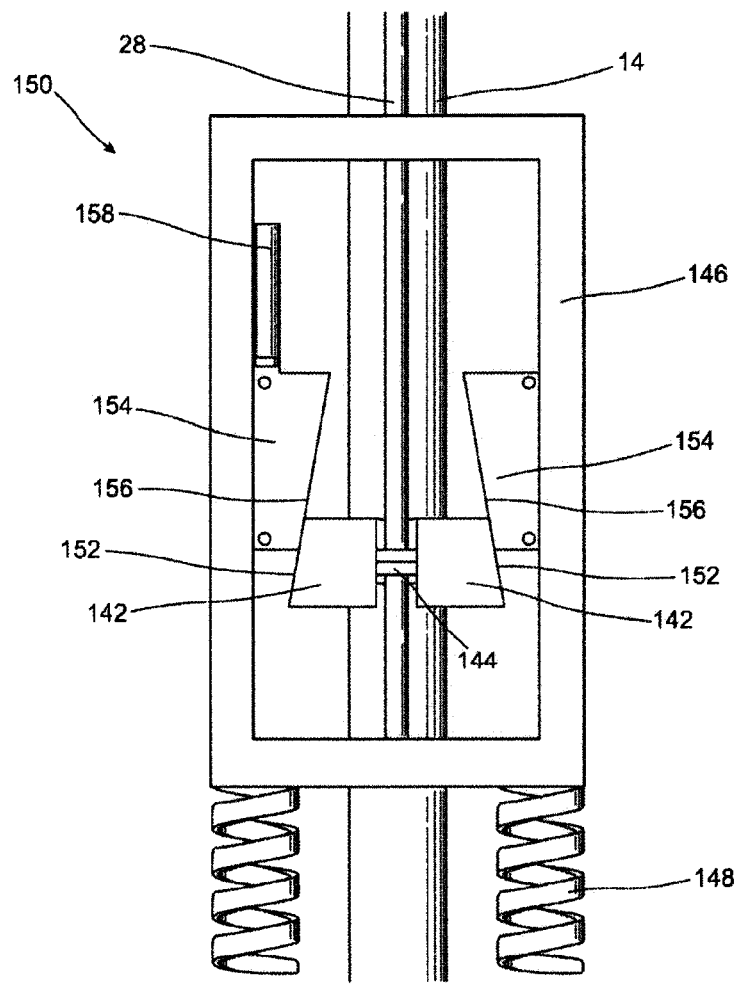
Figure 22:
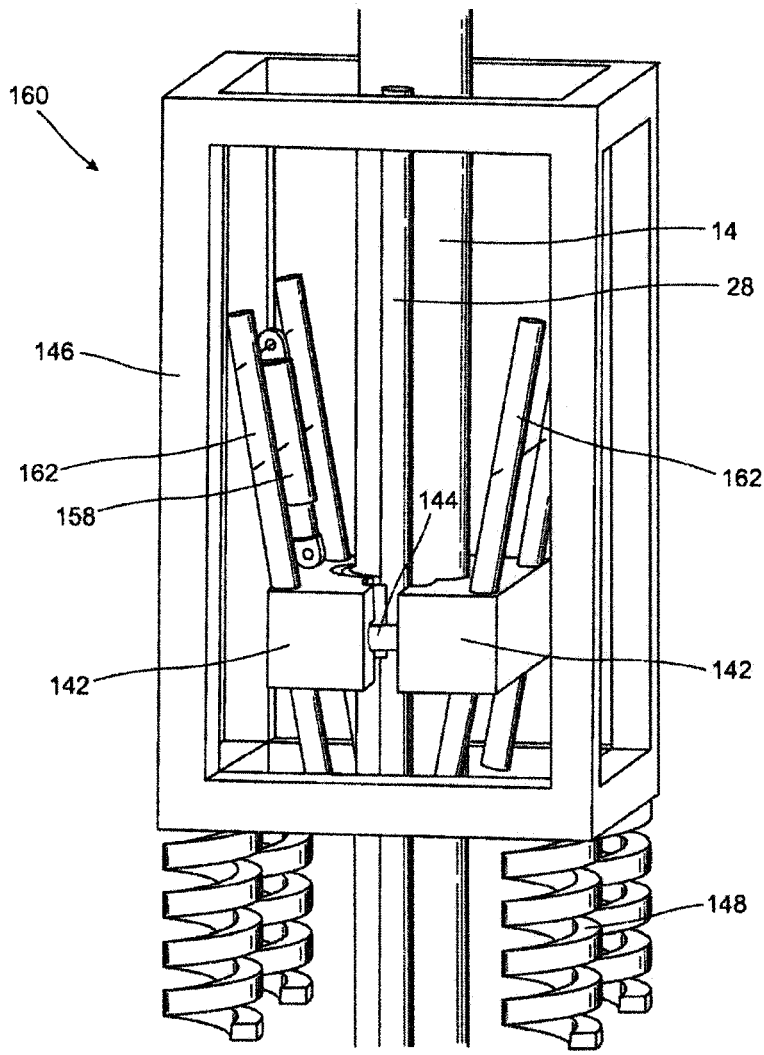
Figure 23:
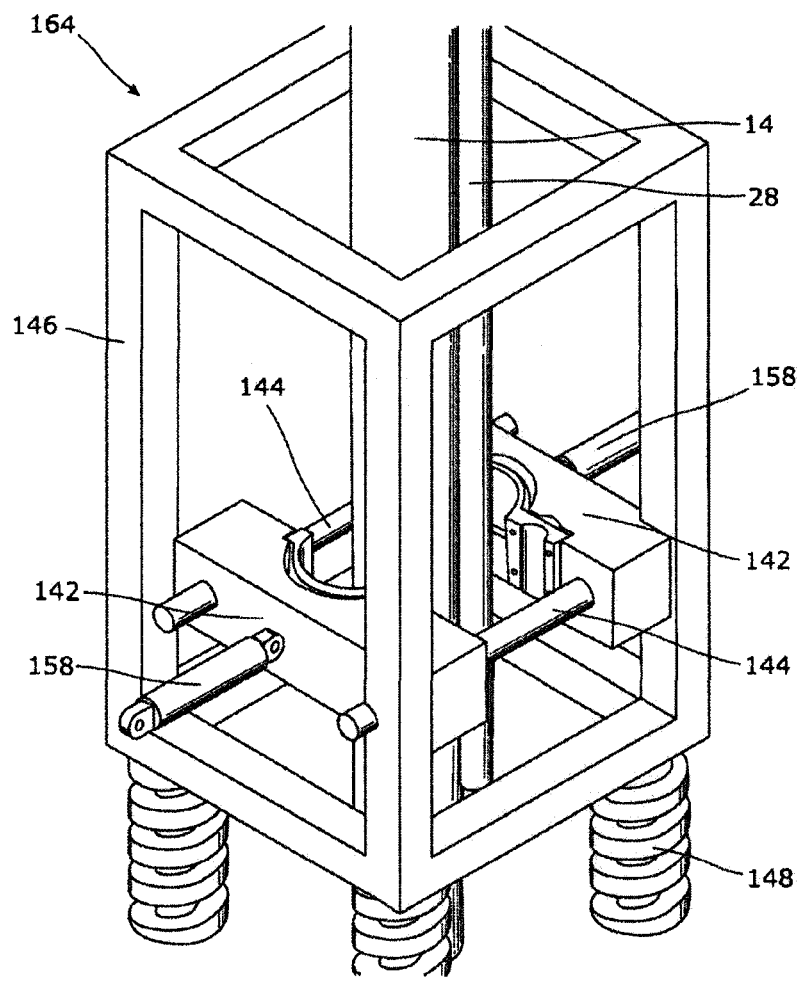

In order that the invention may readily be understood, reference will now be made, by way of example, to the remaining drawings in which:

FIG. 4 is a perspective view of a pair of segments of a piggybacking block in accordance with a first embodiment of the invention;

FIG. 5 is a side view of one of the segments of FIG. 4;

FIG. 6 is a front view of the segment of FIG. 5;

FIG. 7 is a perspective view of a pair of segments of a piggybacking block in accordance with a second embodiment of the invention;

FIG. 8 is a perspective view of piggybacking blocks in accordance with the first embodiment of the invention being assembled and in use on piggybacked pipes;

FIG. 9 is an end view of one of the piggybacking blocks of FIG. 8 in use on the piggybacked pipes;

FIGS. 10 to 14 are side views of barb variants that may be used in the segments shown in FIGS. 4 to 9;

FIGS. 15 to 17 are perspective views of test clamping operations involving prototype piggybacking blocks of the invention;

FIGS. 18a to 18d are partial schematic side views of an apparatus in accordance with the invention for applying piggybacking blocks of the invention to primary and secondary pipes, showing an operational sequence of the apparatus;

FIGS. 19 and 20 are schematic cross-sectional views showing two operational steps of the apparatus shown in FIGS. 18a to 18d;

FIG. 21 is a schematic side view of an alternative apparatus in accordance with the invention for applying piggybacking blocks of the invention to primary and secondary pipes; and FIGS. 22 and 23 are schematic perspective views of alternative apparatuses in accordance with the invention for applying piggybacking blocks of the invention to primary and secondary pipes.

DETAILED DESCRIPTION OF THE INVENTION

Reference will also be made to the appended Table 1, which sets out push-in and pull-out loads for a variety of barb profiles under testing with an interference fit in holes provided in test 'pucks' of Nylon 6-6.

Referring firstly to FIG. 4 of the drawings, a piggybacking block 40 in accordance with a first embodiment of the invention comprises pads in the form of two identical segments 42. The segments 42 are brought together in face-to-face relation about a central bisecting longitudinal plane of symmetry. This forms a block 40 with a figure-eight cross-section that surrounds and locates primary and secondary elements such as pipes, as will be explained.

Referring now also to FIGS. 5 and 6 which show one of the segments 42, the inner side of a segment 42 comprises two approximately half-cylindrical recesses whose axes of curvature are parallel to each other, namely a larger primary recess 44 and a smaller secondary recess 46. The recesses 44, 46 are separated by a central generally oblong face 48 that lies substantially on the central bisecting longitudinal plane. Two further oblong faces 50, 52 lie substantially in the same plane at opposite ends of the segment 42, a lower face 50 being outboard of the primary recess 44 and an upper face 52 being outboard of the secondary recess 46. The axes of curvature of the recesses 44, 46 are parallel to and lie slightly beyond the central bisecting longitudinal plane.

As FIG. 9 will show, the radii of curvature of the primary and secondary recesses 44, 46 are selected to correspond to the outer radii of the primary and secondary pipes 14, 28. When selecting the radii of curvature, allowance may be made for flexing of the segment 42 during assembly of the block 40 as the walls of the recesses 44, 46 bear resiliently against the primary and secondary pipes 14, 28 to apply clamping loads to them.

Each face 48, 50, 52 of the segment 42 has a longitudinally-offset barb 54 that projects orthogonally from the face 48, 50, 52. The barb 54 is spaced longitudinally from a through-hole 56 set into the face 48, 50, 52. The hole 56 and the barb 54 are disposed symmetrically about the longitudinal centre of the face 48, 50, 52. The arrangement of the barbs 54 and the holes 56 is such that when two segments 42 are aligned face-to-face for assembly into the block 40, the barbs 54 of each segment 42 align with the holes 56 of the opposite segment 42. The barbs 54 thus enter the opposed holes 56 when the segments 42 are pressed together around primary and secondary pipes 14, 28 or other elements, to form a block 40 with a figure-eight cross-section.

The segments 42 are of cast or injection-moulded plastics material such as polyamide or polyurethane and the barbs 54 are of steel, although other materials are possible. A segment 42 may be moulded around the barbs 54 in an insert or outsert moulding process or the barbs 54 may be engaged in mounting holes 58 provided in a pre-moulded segment 42. There may, for example, be a threaded engagement between the barbs 54 and the mounting holes 58. Alternatively, there may be an interference fit between the barbs 54 and the mounting holes 58, whose strength may be increased by ribbing, threading or otherwise texturing a root portion of a barb 54 to be received in a mounting hole 58.

As best appreciated in FIG. 4, in this embodiment of the invention, the outer side of each segment 42 has integral longitudinally-spaced ribs 60 that lie in parallel planes. The smooth, plain surfaces of the primary and secondary recesses 44, 46 spread the clamping load on the products to be coupled by the block 40, and maximise the contact area between the segments 42 and the products to ensure even contact pressure distribution.

FIGS. 4 and 5 best show that the outer side of each segment 42 comprises a first convex part-cylindrical formation 62 being the outer side of the primary recess 44. The radius of curvature of the first formation 62 is centred on the same axis of curvature as the primary recess 44. The first formation 62 terminates at its lower end behind the lower face 50 in longitudinally-spaced bulk regions 64 that respectively contain a hole 56 and a barb 54 set into a parallel mounting hole 58. The ribs 60 extend from over the first formation 62 to between the bulk regions 64.

A second convex part-cylindrical formation 66 is on the outer side of the secondary recess 46. The radius of curvature of the second formation 66 is centred on the same axis of curvature as the secondary recess 46. Longitudinally-spaced bulk regions 68 each extend from behind the central face 48 to behind the upper face 52. One of those bulk regions 68 contains two holes 56; the other contains two barbs 54 set into parallel mounting holes 58. The ribs 60 extend over the second formation 62 between the bulk regions 68.

The ribs 60 stiffen the segments 42 with minimum material usage, while retaining some helpful compliance. They also resist post-moulding distortion of the segments 42. The bulk regions 64, 68 add strength at the key interface between the segments 42 via the barbs 54 and the holes 56. The bulk regions 64, 68 ensure there is sufficient material surrounding the barb holes 56; they also provide flat outer surfaces parallel to the central longitudinal plane of the block 40, suitable for the application of inward load to the segments 42 during assembly of the block 40.

Longitudinal grooves 70 are disposed on the upper and lower sides 72, 74 of each segment 42, each extending parallel to and spaced slightly from the lower face 50 and the upper face 52. The grooves 70 are retention features for holding the segments 42 in an assembly machine before the segments 42 are pressed together around primary and secondary pipes 14, 28 or other elements to assemble the block 40.

Chamfers and radii are employed on edges and corners of the segments 42 to minimise stress concentrations, and also to ensure suitable lead-ins for automated handling, for example in hoppers and assembly rollers of assembly machines.

In a second embodiment of the invention shown in FIG. 7, a piggybacking block 76 comprises two identical segments 78 that each have longitudinally-spaced parallel ribs 80 disposed within a primary recess 82 and a secondary recess 84. A first convex part-cylindrical formation 86 on the outer side of the primary recess 82 and a second convex part-cylindrical formation 88 on the outer side of the secondary recess 84 are substantially smooth. This variant has the benefit that the internal ribs 80 improve grip on the products coupled by the block 76; they enhance friction by increasing clamping pressure per unit area, and create a mechanical interface by locally keying into the coatings of the products.

The segments 78 of the second embodiment also have pocket-like indents 90 between bulk regions in a central face 92 and a lower face 94, to reduce material usage without significantly reducing strength. A similar indent 96 is disposed between the bulk regions on the outer side of the lower face 94.

Other features of the second embodiment such as the barbs 54 and the grooves 70 correspond in function to those of the first embodiment; like numerals are used for like features.

FIG. 8 of the drawings shows segments 42 of the first embodiment being pressed together in face-to-face relation around primary and secondary pipes 14, 28 to assemble a block 40 that connects and separates the pipes 14, 28 in a piggyback arrangement. Segments 74 of the second embodiment will work in the same way. The pipes 14, 28 may move continuously or may intermittently be held stationary during assembly of the block 40.

Distal ends of the barbs 54 on each face initially locate in the holes 56 in the counterpart faces of the opposed segments 42. Inward pressure applied to the flat outer surfaces of the bulk regions 64, 68 at the arrows P shown in FIG. 8 then forces the segments 42 together as the barbs 54 are urged deeper into the holes 56.

As best shown in the cross-sectional view of the assembled block in FIG. 9, the semi-cylindrical primary recesses 44 of the opposed segments 42 form a substantially circular enclosure for the primary pipe 14 and the semi-cylindrical secondary recesses 46 of the opposed segments 42 form a substantially circular enclosure for the secondary pipe 28. The secondary pipe 28 is spaced from the primary pipe 14 by the height of the central face 48.

When the segments 42 are fully pressed together, contact between the faces 48, 50, 52 and their counterparts of the opposed segment 42 is not essential. Indeed, it is advantageous for at least one of the faces 48, 50, 52 to remain slightly apart upon assembly because if the faces 48, 50, 52 on both sides of a clamped pipe 14, 28 come together, no additional clamping force will be applied to that pipe 14, 28 clamped between the segments 42.

Resilience of the segments 42 helps to ensure a snug fit around the primary and secondary pipes 14, 28 and continuous application of clamping force to the pipes 14, 28. This helps to avoid movement of the block 40 with respect to the pipes 14, 28 for the working life of the piggybacked pipeline, whether axially along the pipes 14, 28 or circumferentially around the pipes 14, 28. It also helps to avoid relative movement between the pipes 14, 28, such as separation beyond the spacing predetermined by the block 40.

Insertion force and insertion movement may easily be measured to infer that there will be sufficient resistance to separation of the segments 42, which could otherwise cause loosening or unintended disassembly of the block 40 due to withdrawal of the barbs 54 from the holes 56. Test results such as those discussed below may be used to develop targets for insertion force and insertion movement that will ensure sufficient resistance to separation of the segments 42.

After assembly, a block 40 is carried downstream by the overboarding or launching movement of the pipes 14, 28 from right to left as shown in FIG. 8, allowing the next block 40 to be assembled from further segments 42 upstream of the preceding block 40.

The block of the invention is apt to be assembled in a largely automated process, to the benefit of speed, clamping strength and safety. Advantageously, there is no need to encircle the primary and secondary pipes with straps, hence avoiding an awkward and time-consuming operation that is difficult to automate and that gives unpredictable clamping strength. Instead, the segments are brought together as two halves from opposite sides of the pipes and assembled robustly in a simple press-fit operation with predictable and easily-verifiable results.

Moving on now to the barb variants in FIGS. 10 to 14 of the drawings, these show some examples of the many profiles that may be adopted to tailor insertion and withdrawal forces.

Each barb variant 54A to 54D in FIGS. 10 to 13 has three portions: a root portion 98 at a proximal end; a narrowed alignment portion 100 at a distal end; and a shank portion 102 disposed between the root portion 98 and the alignment portion 100. The barb variant 54E in FIG. 14 has just a root portion 98 at a proximal end and a shank portion 102 at a distal end, although the distal end of the shank portion 102 is tapered slightly to aid alignment with a hole 56 of a segment 42, 74.

The root portion 98 of each barb 54A to 54E is adapted for engagement within a mounting hole 54 of a segment 42, 74. As mentioned previously, the root portion 98 may be threaded or otherwise textured; see for example the ribbed root portion 98 of the barb 54E in FIG. 14. It is also possible for a segment 42, 74 to be moulded around the root portion 98 with the remainder of the barb 54A to 54E protruding from the moulding.

The narrowed alignment portion 100 at the distal end of each barb 54A to 54D and the tapered distal end of the barb 54E help to locate and align the barbs 54A to 54E in the holes 56 in the counterpart faces of the opposed segments 42, 74, before inward pressure forces together the segments 42, 74 by urging the barbs 54A to 54E deeper into the holes 56.

The barbs 54A to 54E differ by the profiles of their shank portions 102, which are used to determine insertion and withdrawal forces when engaged in the holes 56 of the opposed segments 42, 74.

The shank portion 102 of the barb 54A of FIG. 10 has a plain cylindrical surface for an interference fit within a hole 56. The shank portions 102 of the barbs 54B to 54E of FIGS. 11 to 14 are shaped or textured to strengthen the interference fit within a hole 56. Testing has shown that such shaping or texturing is advantageous and may be necessary to achieve acceptable pull-out loads.

The shank portions 102 of the barbs 54B and 54C of FIGS. 11 and 12 respectively each have a ribbed or ridged surface comprising circumferential, radially-projecting ridges or ribs 104 equi-spaced along the shank portion 102. Each rib 104 has a distally-facing frusto-conical ramp surface 106 and a proximally-facing shoulder 108 orthogonal to the otherwise cylindrical surface of the shank portion 102. The ramp surface 106 is at an angle of nominally 30° to the longitudinal axis of the barb 54B, 54C, and the height of each rib 104 is about 0.5 mm as part of an overall shank diameter of nominally 12 mm. Advantageously, the directionality imparted by the ramp surfaces 106 and shoulders 108 increases pull-out loads without increasing push-in loads to the same extent.

The barbs 54B and 54C differ in the pitch of the ribs 104, the ribs 104 of the barb 54B of FIG. 11 being more widely spaced than those of the barb 54C of FIG. 12. For example, the pitch of the ribs 104 of the barb 54B may be 5 mm and the pitch of the ribs 104 of the barb 54C may be 3 mm.

The shank portion 102 of the barb 54D of FIG. 13 is an example of a threaded profile, in this case with an American buttress thread 110 of, for example twelve, sixteen or twenty threads per inch (25.4 mm). Other threads and pitches are possible, such as M12×1.75. A threaded shank portion 102 is not used for threaded engagement with a hole 56 but simply as an easy-to-manufacture high-grip texture to increase the strength of the push-fit between the barb 54D and the hole 56.

The barb 54E of FIG. 14 has a similar ribbed profile on its shank portion 102 as the barbs 54B and 50C of FIGS. 11 and 12, in this instance with a 3 mm pitch between ribs 104 like that of the barb 54C. The root portion 98 of the barb 54E also has a ribbed profile with the same pitch between ribs 104 as the shank portion 102 but with the ramp surfaces 106 and shoulders 108 of the ribs 104 reversed in direction. The barb 54E is therefore symmetrical about a transverse plane at its longitudinal mid-point.

Possible alternative profiles for the shank portion 102 include a ring shank profile, a rebar profile with a spiralled or twisted form, and a knurled finish. However rebar and knurling have been found to have an undesirable combination of high push-in loads and lower pull-out loads.

The profiles of barbs 54A to 54E illustrated in FIGS. 10 to 14 and the alternative profiles mentioned above have been tested by being pushed into and pulled out holes in cylindrical circular-section puck-like test pieces of Nylon 6-6, representing the moulded body of a segment 42, 74. The hole extends axially through the puck and so is disposed centrally on a circular face of the puck. Pucks of 30 mm diameter and 60 mm diameter across the circular face were used in testing to replicate different amounts of plastics material around the barb at different regions of a segment 42, 74. The pucks of 30 mm diameter were 50 mm thick and the pucks of 60 mm diameter were 60 mm thick.

The barbs 54A to 54E were pushed in to the pucks until their shank portions 102 were fully engaged, with the proximal root portions 98 protruding from the pucks. The peak push-in load was recorded in each case. The barbs 54A to 54E were then pulled out of the pucks by tensile loads applied via their protruding root portions 98. The peak pull-out load was recorded in each case.

The results of these tests are set out in the appended Table 1. The barb profiles that performed best were the ribbed barbs 54C and 54E with 3 mm pitch between the ribs 104 as shown in FIGS. 12 and 14 and a threaded barb 54D with an American buttress thread 110 of twenty threads per inch (25.4 mm) as shown in FIG. 13. The ribbed barb 54C of FIG. 12 gave better results than the threaded barb 54D of FIG. 13 but the ribbed barb 54C has the disadvantage of being a non-standard profile that may cost more to manufacture than a standard thread profile.

Various alternatives to Nylon 6-6 were tested, including Aquanyl (a copolymer of Nylon 6 and Nylon 12) supplied by Nylacast Ltd and LUCPREEN-DT 75D (a polyurethane product) supplied by LUC Group. All trade marks are acknowledged. These are merely examples of materials that have achieved encouraging results in testing; other materials are possible. Key considerations for material choice are: cost; weight; sufficient bulk material at the fixing locations; sensitivity to tolerance; ease of manufacture; interaction with an assembly machine; and interaction with the pipes or other elongate products being clamped in a piggyback arrangement.

Moving on now to FIGS. 15 to 17 of the drawings, these show test clamping procedures involving prototype segments 112 of the invention. The prototype segments 112 are milled from Nylon 6-6 rather than moulded and they lack the stiffening ribs 60, 80 of the preceding embodiments. Also, the primary and secondary pipes 14, 28 are disposed side-by-side for test purposes whereas, as noted in the introduction, the secondary pipe 28 will generally be directly above and/or aft of the primary pipe 14 in field operations.

In FIGS. 15 to 17, the primary and secondary pipes 14, 28 extend in parallel through an encircling rigid frame 114. A lower segment 112 lies face-up, supported at each end by load-bearing spacers 116 at the bottom of the frame 114. The mutually-spaced pipes 14, 28 are received within respective primary and secondary recesses 44, 46 of the lower segment 112.

An upper segment 112 is disposed face-down above the lower segment 112. The primary and secondary recesses 44, 46 of the upper segment 112 lie atop the primary and secondary pipes 14, 28 respectively. The barbs 54 of each segment 112 are received within the opposed holes 56 of the other segment 112.

A pair of hydraulic jacks 118, each of nominally 10 Te capacity, acting against the underside of a cross-member 120 of the frame 114 apply load to the upper segment 112 via steel plates 122. This forces the upper segment 112 into closer engagement with the lower segment 112 as the barbs 54 advance into the holes 56, eventually clamping the pipes 14, 28 between the segments 112. The jacks 118 and plates 122 may be moved laterally along the underside of the cross-member 120 to apply localised forces to different parts of the upper segment 112.

FIG. 15 shows one of the jacks 118 applying force locally to an end of the upper segment 112, outboard of the secondary recess 46 of the upper segment 112. This applies compressive load in alignment with the opposed upper faces 52 of the segments 112. The other jack 118 simultaneously applies force locally to the other end of the upper segment 112, outboard of the primary recess 44 of the upper segment 112. This applies compressive load in alignment with the opposed lower faces 50 of the segments 112.

In contrast, FIG. 16 shows the first-mentioned jack 118 and its plate 122 moved inboard to apply force locally to a central part of the upper segment 112, inboard of its secondary recess 46. This applies compressive load in alignment with the opposed central faces 48 of the segments 112, between their primary and secondary recesses 44, 46.

FIG. 17 shows that it is also possible to apply compressive load simultaneously at all three opposed pairs of faces of the segments 112, namely the central, lower and upper faces 48, 50, 52. This is achieved by using a wider plate 124 under one of the jacks 118 to bridge the secondary recess 46 of the upper segment 112 and hence to apportion load from that jack 118 between the central and upper faces 48, 52. Again, the other jack 118 simultaneously applies force locally to the other end of the upper segment 112, outboard of the primary recess 44 of the upper segment 112. This applies compressive load in alignment with the opposed lower faces 50 of the segments 112.

These test procedures have shown some benefits in moving the location of force application along the segments 112 during the clamping process. There is an advantage in pressing together the end regions of the segments 112 first as shown in FIG. 15 to locate the segments 112 relative to one another; thereafter, further pressure achieves light clamping that helps to locate the segments 112 relative to the pipes 14, 28. This causes the segments 112 to bend along their length, bowing slightly as the barbs 54 of their central faces 48 resist insertion into the opposed holes 56. Subsequent application of force in alignment with the central faces 48 as shown in FIG. 16 presses together the middle of the segments 112, straightening the bend, and tightens the clamping load on the pipes 14, 28.

FIGS. 18*a* to 18*d*, 19 and 20 illustrate an apparatus 126 for holding and dispensing segments 42 and for assembling blocks 40 from such segments 42 around primary and secondary pipes 14, 28. FIGS. 18*a* to 18*d* show only half of the apparatus 126 whereas FIGS. 19 and 20 show the whole apparatus 126. The pipes 14, 28 are shown in vertical orientation in FIGS. 18*a* to 18*d* although their path may be inclined at other angles as explained previously. FIGS. 19 and 20 are horizontal cross-sections at upstream and downstream parts of the apparatus 126.

The apparatus 126 comprises opposed reciprocating jaws 128, each having a cavity 130 shaped to accommodate a segment 42 with its recesses 44, 46 facing out of the cavity 130 toward the segment 42 in the cavity 130 of the opposed jaw 128. The apparatus 126 further comprises pinch wheels 132 downstream of the jaws 128, aligned with the central faces 48 of the segments 42. The pinch wheels 132 contra-rotate about parallel axes in a plane orthogonal to the pipes 14, 28. As will be explained, this arrangement having pinch wheels 132 downstream of the jaws 128 achieves the two-step engagement operation found to be advantageous during testing as illustrated in FIGS. 15 to 17, with application of compressive loads to different parts of the segments 42 in successive steps.

Opposing reciprocating movement of the jaws 128 is driven by double-acting hydraulic actuators 134. The actuators 134 extend to push the jaws 128 toward one another in an assembly stroke, which forces the segments 42 together to form a block 40 around the pipes 14, 28. When the actuators 134 retract in a return stroke, they pull the jaws 128 away from the assembled block 40 and the block 40 is then carried downstream by overboarding or launching movement of the pipes 14, 28. The jaws 128 are then loaded with fresh segments 42 from a stack 136 in a jaw loading step and the assembly stroke begins again, to assemble a further block 40 at a location spaced a suitable distance upstream of the preceding block 40.

As FIG. 19 shows, the segments 42 are held in the jaws 128 by latch formations in the form of ridges 138 in the ends of the cavities 130 that engage the grooves 70 in the ends of the segments 42. The resilience of the segments 42 allows the grooves 70 to disengage from the ridges 138 to snap out of the cavities 130 upon assembly of a block 40 but to be held by the jaws 128 until that point. The direction of the grooves 70 and ridges 138 allows the segments 42 to start sliding out of the jaws 128 when the segments 42 grip the pipes 14, 28 during an assembly stroke, so that the pipes 14, 28 can move continuously as blocks 40 are applied to them. Also, the direction of the grooves 70 and ridges 138 allows a supply of segments 42 to be retained in the stack 136 as shown in FIGS. 18*a* to 18*d* and for the retained segments 42 in the stack 136 to slide under gravity or to be driven down into engagement with an associated jaw 128 in a jaw loading step.

FIG. 19 also shows that each cavity 130 fits closely against the associated segment 42 at locations aligned with the faces 48, 50, 52. This applies compressive loads locally where barbs 54 are to be driven into opposed holes 56 in those faces 48, 50, 52. Clearance is provided around the part-cylindrical formations 62, 66 corresponding to the primary and secondary recesses 44, 46, to allow for deflection of the segments 42 under load when the segments 42 apply clamping forces to the pipes 14, 28.

The cavities 130 are shaped to apply pressure preferentially to the end regions of the segments 42, which firstly locates the opposed segments 42 relative to one another and then applies light clamping pressure to the pipes 14, 28. This helps to locate the opposed segments 42 relative to the pipes 14, 28 for further operations on the resulting block 40. In this case, the cavities 130 are shaped to accommodate slight bowing of the segments 42 as the barbs 54 of their central faces 48 resist insertion into the opposed holes 56. Consequently, the segments 42 are not fully engaged to each other when a block 40 exits the jaws 128 and is carried downstream with the pipes 14, 28. Instead, engagement of the segments 42 is completed by squeezing the segments 42 between the pinch wheels 132 located downstream of the jaws 128.

Blocks 40 with partially-engaged segments 42 may be driven between the pinch wheels 132 by virtue of movement of the pipes 14, 28 to which they are clamped, in which case the pinch wheels 132 may simply idle and freewheel. Alternatively one or both of the pinch wheels 132 may be driven to drive the blocks 40 between them. The pinch wheels 132 press together the middle of the segments 42 in alignment with their central faces 48 and tighten the clamping load on the pipes 14, 28. The pipes 14, 28 and the attached blocks 40 are now ready for launching into the sea.

FIGS. 18*a* to 18*d* show a retaining pawl 140 that holds a segment 42 in a cavity 130 of a jaw 128 until the segment 42 has been engaged to an opposed segment 42 to assemble a block 40 around the pipes 14, 28. The retaining pawl 140 comprises a flexible flap attached to the jaw 128 that lies flat and horizontal by virtue of its resilience before the assembly stroke as shown in FIG. 18*a*, supporting the segment 42 in the cavity 130 of the jaw 128 and the stack 136 of segments 42 stored above. FIG. 18*b* shows the assembly stroke where the segment 42 has been advanced by the jaw 128 to engage the opposed segment 42 (not shown in this view) and hence to grip the pipes 14, 28. Now, the segment 42 must move with the pipes 14, 28 and so exits the cavity 130 of the jaw 128. The retaining pawl 140 flexes downwardly to allow the segment 42 to pass as shown in FIGS. 18*b* and 18*c* before snapping back resiliently to the horizontal as shown in FIG. 18*d*, as the block 40 just assembled encounters the pinch wheels 132 to complete the engagement of its segments 42.

The apparatus of the invention may take other forms; three further examples of such apparatus are shown in FIGS. 21 to 23 of the drawings. In each case, opposed jaws 142 move orthogonally on connecting rods 144 with respect to the direction of movement of the pipes 14, 28 to drive together opposed segments 42 to form a block 40 around the pipes 14, 28. The jaws 142 are supported by a reciprocating carriage frame 146 surrounding the pipes 14, 28, which allows the segments 42 to be engaged as the pipes 14, 28 continue moving in an overboarding or launching direction.

In an engagement stroke, the carriage frame 146 moves downwardly from a start position in the direction of movement of the pipes 14, 28 while the jaws 142 move together to engage the segments 42. Once the segments 42 are engaged to form a block 40 at the bottom of the engagement stroke, the jaws 142 separate to free the block 40 and the carriage frame 146 moves in a return stroke against the direction of movement of the pipes 14, 28 back to the start position.

The carriage frame 146 may move in the engagement stroke passively as a result of the segments 42 held by the jaws 142 gripping the moving pipes 14, 28. Alternatively, movement of the carriage frame 146 in the engagement stroke may be driven by a drive means such as a downwardly-acting hydraulic actuator, which is not shown. Movement of the carriage frame 146 in the return stroke is driven or aided by springs 148 acting in compression under the carriage frame 146; other drive means such as a hydraulic actuator are of course possible.

The jaws 142 may be arranged to engage the segments 42 fully to complete a block 40 or a further tightening apparatus is possible downstream of the carriage frame 146, for example having a pair of pinch wheels like those described in the apparatus 126 described above. Such further tightening apparatus has been omitted from FIGS. 21 to 23 for clarity. Similarly a retaining pawl like that shown in FIGS. 18a to 18d may be applied to a jaw 142 to hold a segment 42 in a cavity of the jaw 142 until opposed segments 42 have been engaged to each other to form a block 40 around the pipes 14, 28.

The examples shown in FIGS. 21 to 23 differ in how the jaws 142 are driven to move relative to the carriage frame 146.

The apparatus 150 shown in FIG. 21 employs opposed wedge surfaces 152, 156 to drive the jaws 142 together. Specifically, outer faces of the jaws 142 have wedge surfaces 152 that taper inwardly and upwardly, and the carriage frame 146 carries wedge blocks 154 with complementary wedge surfaces 156 that taper outwardly and downwardly. The wedge blocks 154 are driven downwardly with respect to the carriage frame 146 by one or more hydraulic actuators 158 to force the jaws 142 together by a sliding cam action of the wedge surfaces 152, 156.

Springs or other drive means (not shown) may be used to push the jaws 142 apart at the end of the engagement stroke, or there may be a mechanical link between the wedge blocks 154 and the jaws 142 to pull the jaws 142 apart as a wedge block 154 is pulled upwardly by the actuator 158 relative to the carriage frame 146.

The apparatus 160 shown in FIG. 22 mounts the jaws 142 on converging ramp rods 162 fixed to the carriage frame 146 that are disposed in parallel pairs on each jaw 142, the ramp rods 162 of each pair being inclined inwardly and downwardly. A hydraulic actuator 158 drives the jaws 142 downwardly relative to the carriage frame 146 along the ramp rods 162 to force the jaws 142 together during the engagement stroke. The actuator 158 is suitably double-acting to pull the jaws 142 back up along the ramp rods 162 during the return stroke, separating the jaws 142 ready for the insertion of further segments 142.

The apparatus 160 of FIG. 22 has the benefit that the jaws 142 can move further during the engagement stroke, which maximises the pipelaying speed. This is because the jaws 142 move relative to the carriage frame 146 in the direction of movement of the pipes 14, 28 as the carriage frame 146 itself moves in the direction of movement of the pipes 14, 28.

FIG. 23 shows an apparatus 164 in which the jaws 142 are simply mounted for reciprocal movement with respect to the carriage frame 146 in directions orthogonal to the direction of movement of the pipes 14, 28. The reciprocal movement of the jaws 142 is driven by respective double-acting hydraulic actuators 158. It would be possible also to mount the jaws 142 and actuators 158 to the carriage frame 146 via a subframe (not shown) permitting longitudinal movement of the jaws 142 and actuators 158 with respect to the carriage frame 146, to maximise movement of the jaws 142 in the direction of movement of the pipes 14, 28 during the engagement stroke.

The invention claimed is:

1. An apparatus for clamping elongate elements in a parallel piggybacked arrangement during subsea laying of the elements, the apparatus comprising opposed reciprocating jaws that move orthogonally with respect to a launch direction of the elements toward one another in an assembly stroke and retract in a return stroke, each jaw having a cavity shaped to accommodate a clamp segment, and each jaw being arranged to force together the clamp segments around the elongate elements to assemble a piggybacking clamp that applies clamping forces to the elongate elements, wherein the cavity of each jaw has at least two press surfaces for applying assembly force to separate locations of a clamp segment in the cavity, those locations being disposed to either side of a portion of the clamp segment that accommodates at least one of the elongate elements, and wherein the jaws are supported by a carriage that is movable reciprocally in an engagement stroke in the launch direction during clamping and in a return stroke opposed to the launch direction after clamping.

2. The apparatus of claim 1 wherein the press surfaces extend substantially orthogonally with respect to a reciprocating direction of the jaws.

3. The apparatus of claim 1, wherein the cavity is shaped between the press surfaces to provide clearance for outward deflection of a clamp segment applying clamping forces to the elongate elements.

4. The apparatus of claim 1, wherein each cavity has retention formations engageable with corresponding retention formations of the clamp segments.

5. The apparatus of claim 4, wherein the retention formations and the corresponding retention formations are releasable in a direction generally parallel to the elongate elements.

6. The apparatus of claim 1, wherein the elongate elements are movable longitudinally with respect to the apparatus during clamping in the launch direction, and the cavities are open-sided to allow the assembled clamp to move out of the jaws with the elongate elements in the launch direction.

7. The apparatus of claim 6, further comprising at least one retaining pawl for holding a clamp segment in a cavity until that clamp segment has been assembled into a clamp.

8. The apparatus of claim 7, wherein the retaining pawl is biased into a retaining position to hold the clamp segment in the cavity and is movable against that bias into a release position to release the clamp segment from the cavity.

9. The apparatus of claim 1, wherein each clamp segment has two or more generally parallel mutually spaced recesses shaped to extend partially around respective ones of the elongate elements, and the apparatus is arranged to apply assembly force to one side of at least one of the a recesses and subsequently to another side of that recess.

10. The apparatus of claim 1, further comprising a tightening device downstream of the jaws to tighten the engagement of clamp segments initially assembled by the jaws.

11. The apparatus of claim 10, wherein each clamp segment has two or more generally parallel mutually-spaced recesses shaped to extend partially around respective ones of the elongate elements, the apparatus is arranged to apply assembly force to one side of a recess and subsequently to another side of that recess, and the tightening device is arranged to apply tightening force between the recesses.

12. The apparatus of claim 10, wherein the tightening device comprises a constriction through which at least part of the clamp passes after leaving the jaws.

13. The apparatus of claim 12, wherein the constriction is defined by pinch wheels between which at least part of the clamp is forced after leaving the jaws.

14. The apparatus of claim 1, wherein the elongate elements are movable longitudinally in the launch direction with respect to the apparatus, and the jaws are supported by a carriage that is movable in the launch direction with respect to the elongate elements during clamping.

15. The apparatus of claim 14, wherein the jaws are movable in the launch direction with respect to the carriage as the carriage moves in the launch direction during clamping.

16. The apparatus of claim 15, wherein the jaws are movable toward each other on converging paths as they move in the launch direction with respect to the carriage.

17. The apparatus of claim 14, wherein the jaws are movable toward each other by a wedge member that is movable longitudinally in the launch direction relative to the carriage.

18. The apparatus of claim 14, wherein the jaws are movable with respect to the carriage by actuators acting between the carriage and the jaws.

19. A piggybacked arrangement of two or more elongate elements for subsea laying, made by the apparatus as defined in claim 1.

20. A laying vessel fitted with the apparatus as defined in claim 1.

* * * * *